(12) United States Patent
Bickers et al.

(10) Patent No.: US 6,985,325 B2
(45) Date of Patent: Jan. 10, 2006

(54) UPDATEABLE CENTRALIZED DATA POSITION INFORMATION STORAGE SYSTEM

(75) Inventors: Richard Arthur Bickers, Bristol (GB); Simon Rae, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 652 days.

(21) Appl. No.: 09/917,783

(22) Filed: Jul. 31, 2001

(65) Prior Publication Data

US 2003/0026031 A1 Feb. 6, 2003

(51) Int. Cl.
*G11B 15/18* (2006.01)

(52) U.S. Cl. .......................... 360/72.2; 360/72.3; 707/2
(58) Field of Classification Search ................ 360/72.1, 360/72.2, 48, 72.3, 31; 707/7, 2, 3; 714/100; 711/202, 111, 112
See application file for complete search history.

(56) References Cited

U.S. PATENT DOCUMENTS

| | | | |
|---|---|---|---|
| 5,388,016 A | 2/1995 | Kanai et al. | 360/72.1 |
| 5,525,902 A * | 6/1996 | Nakajima et al. | 324/212 |
| 5,543,977 A | 8/1996 | Shih et al. | 360/48 |
| 5,566,032 A | 10/1996 | Cleveland et al. | 360/72.2 |
| 5,717,951 A | 2/1998 | Yabumoto | 710/11 |
| 5,757,571 A * | 5/1998 | Basham et al. | 360/72.1 |
| 5,969,893 A | 10/1999 | Basham et al. | 360/49 |
| 6,268,975 B1 * | 7/2001 | Bickers | 360/72.2 |
| 6,490,114 B1 | 12/2002 | Gill et al. | 360/72.2 |
| 6,546,384 B2 | 4/2003 | Shaath et al. | 702/2 |
| 6,611,394 B1 * | 8/2003 | Kato et al. | 360/69 |
| 2003/0026021 A1 * | 2/2003 | Goodman et al. | 360/48 |

FOREIGN PATENT DOCUMENTS

| | | |
|---|---|---|
| EP | 0559974 A1 | 9/1993 |
| WO | 91/10998 | 7/1991 |

\* cited by examiner

*Primary Examiner*—Andrew L. Sniezek

(57) ABSTRACT

A method of centralized data position information storage comprising the steps of arranging a byte stream of data into partitioned logical data, providing an updateable centralized storage area being operable to store data position information relating to the logical data, utilizing the information to locate a target data and storing the data position information in the storage area using a first algorithm applied to the target data to update the storage area with target data position information and using a second algorithm applied to a non-target data to update the storage area with non-target data position information such that data position information is accumulated in the centralized storage area when a target data is located and accessed.

8 Claims, 20 Drawing Sheets

UPDATEABLE CENTRALIZED DATA POSITION INFORMATION STORAGE SYSTEM

FIELD OF THE INVENTION

The present invention relates to a method and apparatus of storing and updating data position information relating to data distributed on a tape data storage device.

BACKGROUND TO THE INVENTION

In order to store information it is known to use a magnetic tape storage system in which a magnetic tape is wound on reels or spools. These magnetic tape information storage systems are extensively used to back up archive and store data for future use by a user of, for example, a host user interface or PC.

A typical magnetic tape storage device 100 is illustrated in FIG. 1. The tape storage device 100 may be a stand alone unit, or may be integrated within a casing of a host computer entity 101. The data storage device is operable to receive data from a host computer entity and store data on a magnetic tape data storage medium, contained within a tape cartridge, and also to read data from cartridges, and input read data to the host computer 101.

Referring to FIG. 2 herein, there is shown schematically in external view, a typical known tape data storage cartridge 200, comprising a casing 201 containing in this case, a single reel upon which is wound a length of magnetic tape data storage medium. The magnetic tape data storage medium is wound in and out of the cartridge through an aperture 202, onto a reel within the tape data storage device in use.

Referring to FIG. 3 herein, there is illustrated schematically a cartridge 200 inserted into a tape data storage device 100, wherein a length of tape data storage medium 300 is wound from an internal reel 301 of the cartridge, through a series of capstans and rollers 302–305 onto a second reel 306 comprising the tape data storage device. The tape data storage device comprises a read/write head 307 over which the tape is drawn, in forward and reverse directions, to apply read or write operations of user data to the tape.

Typically, the tape drive controls the movement of the tape over the write head to record data onto the magnetic tape, and over the read head to generate an electrical signal from which the stored data can be reconstructed. Commonly, the read and write heads may be combined into a single read/write head, this head being controlled by the tape drive.

A length of magnetic tape as known in the art is illustrated in FIG. 4 such that data is recorded onto the tape in a series of data tracks 400. When a command is issued by a host computer to read a specific target data on the tape the tape drive using a read head must scan the data tracks 400 to locate the position of the target data thereby allowing the read head to retrieve the data and transfer it back to the host. The tape drive, being configured to ascertain a current position on the tape relative to a Beginning Of Tape or Wrap (BOW), scans the data tracks 400 until the read head passes over a directory 401 positioned at the BOW.

In the example shown here, the directory being located at the BOW is configured such that its contents are distributed across the tape, at the end of each Wrap as shown in FIG. 4. The contents of the directory 401 coincide to the separate data tracks 200, such that the contents of the directory 401 located at the BOW or the EOW are used to allow the tape drive to determine if the target data is contained on a relevant data track. If data position information in the area 401 indicates that the target data is not located in a particular data track then the drive must continue reading the data until it comes across the target data. Similar prior art data storage systems utilize a directory stored in a cartridge memory rather than on the tape, data being accessed on tape by a read operation of the cartridge memory.

When recording data onto a magnetic tape it is known to partition the data into a plurality of data sets, such data sets being distributed across the various data tracks. The partitioning of data into data sets distributed across the data tracks provides a physical position of any one particular data set relative to, for example the BOW and EOW. Such a physical positioning being provided as the data sets are spatially separated along the length of the tape.

Within one particular data set the data is further partitioned into a series of records and filemarks, such partitioning giving rise to a logical data position for any particular record or filemark.

Magnetic tape data storage systems known in the art having directories 401 associated with a corresponding data track 400 along the length of a tape, utilize such directories to store logical data position information as detailed in FIG. 5. A data track 400 is illustrated as having data 500 distributed across its length. The data 500 within a data set and positioned on a data track 400 has corresponding data position information stored within the directory as record data position information 501 and filemark data position information 502. Commonly, the directories also contain data position information 503 relating to the positioning of data sets distributed across the length of the data track 400.

Referring to FIG. 6 there is detailed a typical mode of operation of a prior art magnetic tape data storage system having received a target data command from a host. Using the directory located at the BOW, and in particular the contents of the directory located at the BOW and EOW corresponding to a particular data track, the tape drive determines a required tape motion so as to position the read head on a data track corresponding to the data track on which the target data is positioned. The directory contents information at the BOW and the EOW provide information on the positioning of the target data within this particular data track. As the read head is effectively transported to a new data track as shown in FIG. 6 the tape motion may be such that the read head is being transported away from the target data position B. The read head must serially read the data track until it is determined, using the contents of the directory information at the EOW (as shown in FIG. 6) that the tape motion should be reversed in order to allow access to the target data B. Essentially, each data track information area 401 functions as a map of the logical position of the data to the actual physical position of the data on the tape, this data being partitioned into data sets distributed along data tracks. Obviously, the more information a directory, located at the BOW contains, the more complete the mapping of the physical position of data on tape.

However, a prior art storage device having a complete directory (containing information relating to all data on tape) is restricted by the read speed of the tape drive due to the serial reading operation as detailed in FIG. 6 when the read head traverses from, for example, $A^I$ to target data B. Moreover, a directional change of tape motion is undoubtedly required at some stage of the data retrieval process, this adding to the data access time.

Accordingly, the inventors have identified various problems associated with the employment and utilization of such magnetic tape data storage systems as described above and known in the art. The problems identified by the inventors include:

Utilizing data position information in a distributed manner (the spatially separated directories 401) results in excess tape motion and in particular multidirectional changes. This excessive tape motion inevitably leads to a longer time period taken from the issuing of a target data request and the actual reading and retrieval of the target data.

Due to the operational nature of the magnetic tape systems, data on tape is often deleted or updated, if in fact the storage system is capable of data update operations. In the event of data being updated on the magnetic tape the data position information increasingly becomes out of data and hence the search and data access times are increased due to the system having a reduced awareness of a target data position.

The operational nature of the prior art magnetic tape data storage systems, involving multiple data tracks and corresponding multiple directories necessitates additional tape formatting so as to provide such areas for data position information storage. This additional formatting increases the time take for initialization of the magnetic tape to provide a fully functional magnetic tape data storage facility.

The inventors have recognized a need for a magnetic tape data storage system having an updateable centralized data position information storage utility capable of storing data position information relating to data distributed across the tape. The method and apparatus of such a system having an accelerated target data searching utility in relation to that found in the art, is disclosed in detail herein below.

SUMMARY OF THE INVENTION

The inventors, in realizing the numerous problems associated with the prior art magnetic tape storage systems, provide a magnetic tape data storage system having a centralized data position information storage area, such a storage area being updateable with regard to data position information.

The inventors, by utilizing an updateable centralized data storage information area, containing a pseudo data position map, being located in the tape drive of the system, provide an enhanced data storage system over that found in the art, capable of improved data access and retrieval times.

According to a specific implementation of the present invention the updateable centralized data information storage area may initially be devoid of data position information immediately prior to operation of the storage system. Upon and thereafter initialization of the tape storage system the data position information storage area accumulates data position information during data retrieval operations involving target data requests issued by a host (eg. a user interface). Ultimately, and according to a specific implementation of the present invention, the updateable centralized storage area is dynamically built thus producing the pseudo data position map. Moreover, due to the utilization of a centralized storage area the accumulated data position information gathered during the operational activities of the storage system, is capable of being downloaded onto a reserve storage area, if for example, the operational centralized storage area is volatile, as in the case with DRAM.

According to a first aspect of the present invention there is provided a method of centralized data position information storage comprising the steps of:

arranging a byte stream of data into partitioned logical data;

providing an updateable centralized storage area being operable to store data position information relating to said logical data;

utilizing said information to locate a target data being part of said logical data; and storing said data position information in said storage area.

According to a second aspect of the present invention there is provided a method of updating data position information on a tape storage device, said method comprising the steps of:

arranging a byte stream of data into partitioned logical data and recording said data onto a length of tape;

storing data position information relating to said logical data within an updateable centralized storage area;

utilizing said information to determine a required transporting of said logical data passed a read head to allow a target data to be read by said read head, said target data being part of said logical data; and updating said storage area with data position information obtained following a transporting of said logical data passed said read head.

According to a third aspect of the present invention there is provided a data position information storage and utilization device comprising:

partitioned logical data distributed across a length of tape;

an updateable centralized storage area to receive and store data position information relating to said logical data;

a search algorithm to locate a target data being part of said logical data; and a read head to read said data from said tape;

wherein said information is stored in said storage area following a transporting of said logical data passed said read head.

According to a fourth aspect of the present invention there is provided a computer program comprising program commands for implementing a method of centralized data position information storage, said method comprising the steps of:

arranging a byte stream of data into partitioned logical data;

providing an updateable centralized storage area being operable to store data position information relating to said logical data;

utilizing said information to locate a target data being part of said logical data; and storing said data position information in said storage area.

According to a fifth aspect of the present invention there is provided a computer program comprising program commands for implementing a method of updating data position information on a tape storage device, said method comprising the steps of:

arranging a byte stream of data into partitioned logical data and recording said logical data onto a length of tape;

storing data position information relating to said logical data within an updateable centralized storage area;

utilizing said information to determine a required transporting of said data passed a read head to allow a target data to be read by said read head, said target data being part of said logical data; and updating said storage area with data position information obtained following a transporting of said data passed said read head.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 7:
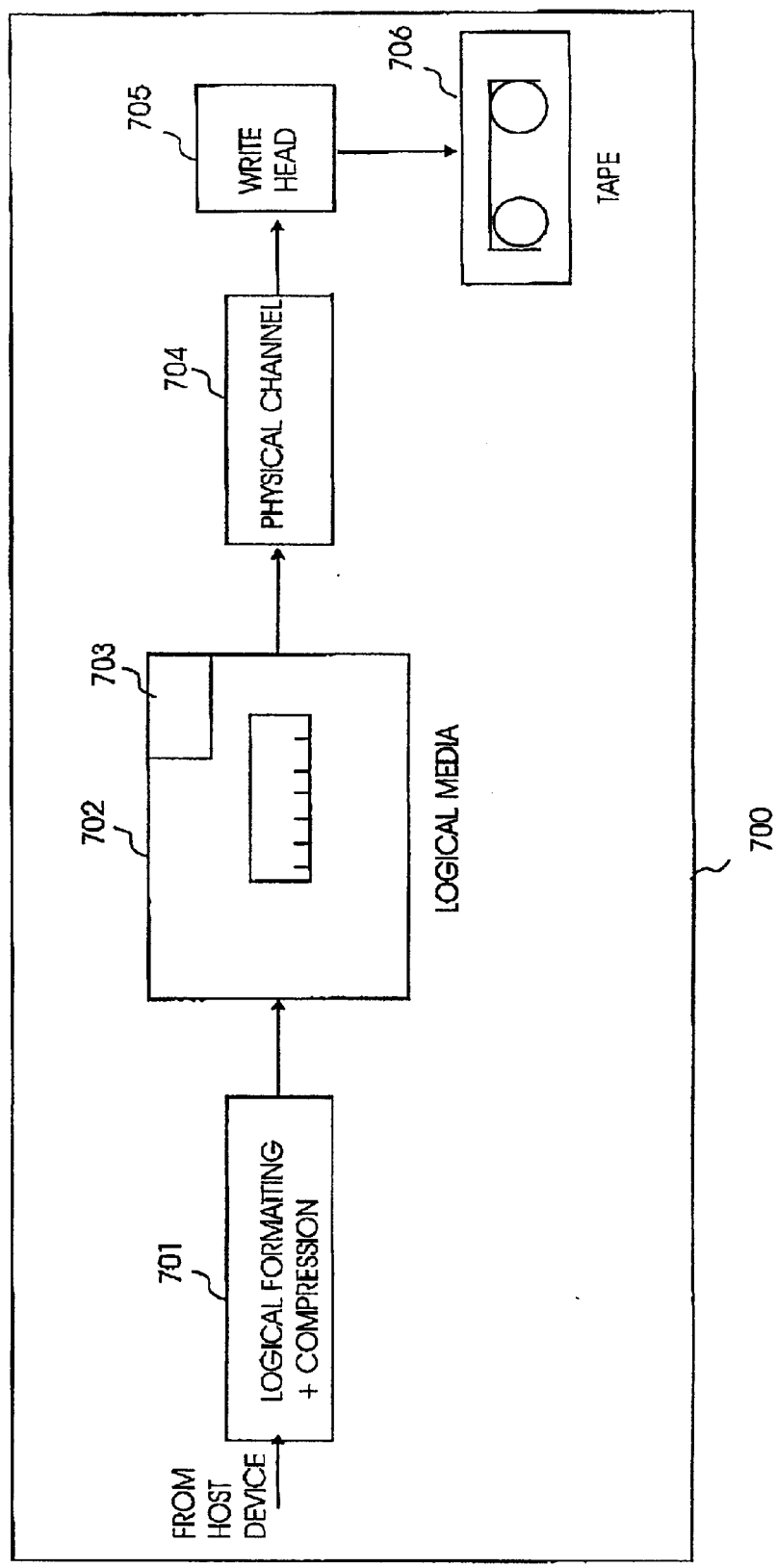
FIG. 7 illustrates a logical pipeline, a logical media having a centralized storage area and a physical pipeline according to a specific implementation of the present invention.

Referring to FIG. 7 there is illustrated three components of a data formatting channel 700 according to the specific implementation of the present invention. The channel 700 comprises a logical data pipeline 701 being operative to perform logical formatting of user data and to compress user data; a host a logical media 702 and a physical pipeline 704. The user data on passing through the logical pipeline, is partitioned into data set form, the compressed data is then transferred to logical media 702 configured with an updateable centralized data position information storage area 703; storage area 703 when constructed, being effectively a pseudo data position map of logical data stored on a length of magnetic tape. The logical media 702 holds a logical representation of the data stored on tape, in the storage area 703 in the form of an index data.

The logical media 702 comprises a dynamic random access memory (DRAM), acting as a logical tape medium.

The physical pipeline 704, is operative to format the logical data into a physical format such that the data can be written to a length of magnetic tape in a predetermined format.

The logical pipeline 701 and the physical pipeline 704 are implemented as a memory device and data processor, configured similarly to a first in-first out buffer (FIFO), but having the capability to apply data processing to the user data as it passes through the components.

The components 701, 702 and 704 may be implemented in the best mode as firmware, e.g. an application specific integrated circuit, or as code.

The logical data received from a host is formatted in the logical pipeline 701 to provide partitioned logical data, this partitioning being in terms of individual records and filemarks. The formatted logical data being in data set form is then passed through the logical media and into the physical pipeline 704.

Formatted user data is input into the logical media 701, where it is stored, in the best mode implementation in a 16 MByte buffer, which acts as a logical tape data storage medium. That is, data can be written to the buffer, spaced back over, and read back the data in a similar fashion as could be applied to a physical tape data storage medium.

Chunks of the data stored in the buffer (logical tape) are configured into data sets and are input into the physical pipeline 704 where they are formatted so that they can be written to physical tape data storage medium.

The physical pipeline is configured to add error recovery information to each data set before being written onto tape. The data sets are written onto the tape according to the next available piece of tape for storing data. The data sets, according to the specific implementation of the present invention, are not necessarily always the same physical size, and accordingly a different number of data sets may be written on different physical data tracks.

Figure 8:
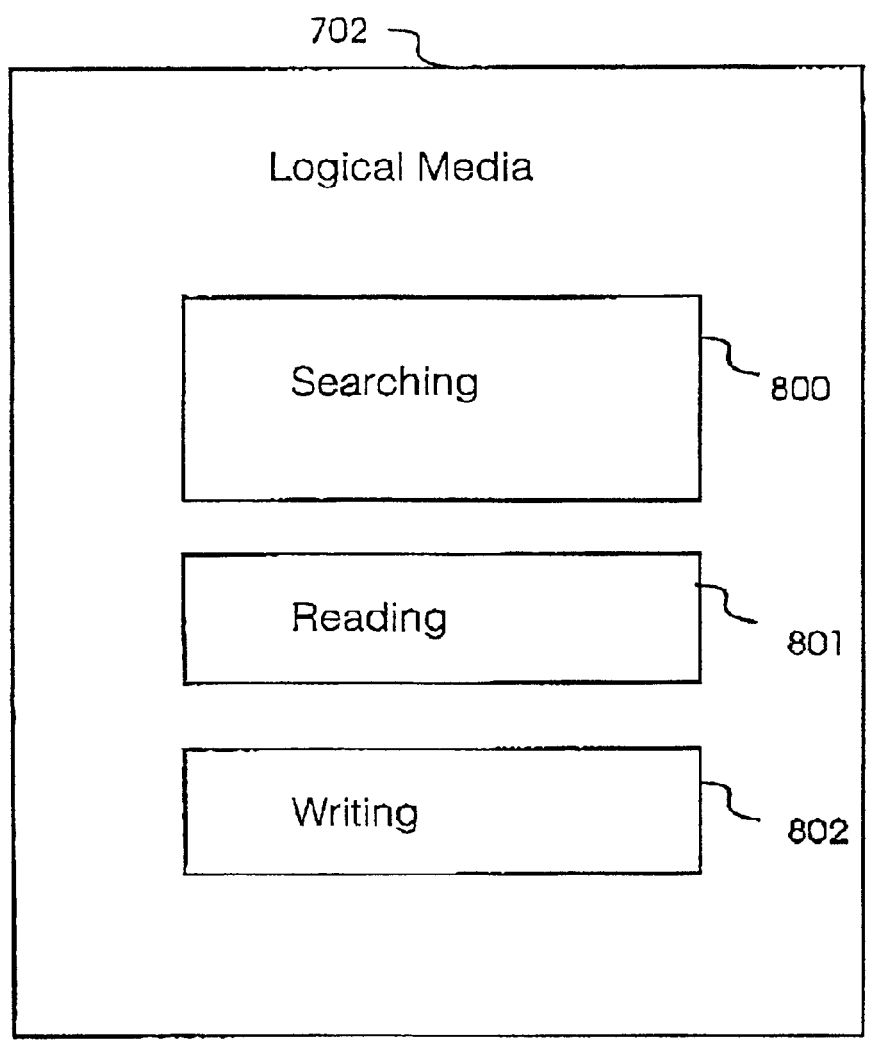
FIG. 8 illustrates the main elements of the logical media.

Referring to FIG. 8 there is illustrated the features of the logical media 702, comprising a searching utility 800, a reading utility 801 and a writing utility 802. According to the specific implementation of the present invention the logical data on passing through the media 702 is not registered in the storage area 703 such that storage area 703, following the writing of data to tape, contains no logical data position information. However, according to further specific implementations of the present invention, data upon passing through the media 702 is registered in the storage area 703 whereby substantially a complete logical data position map of the magnetic tape is produced. Accordingly, a portion of the logical media's capacity is given to the storage of logical data position information such that the media is provided with a searching utility 800. The logical media 702 is configured to read data from the magnetic tape, in the event of a target data request being issued by a host, such a reading utility necessitating a portion of the logical media's capacity. As identified above the logical media is also configured to write data to the magnetic tape storage medium and accordingly requires a portion of the total capacity. According to the specific implementation of the present invention the logical media comprises a 16 megabyte total capacity.

According to a further specific implementation of the present invention the centralized storage area is configurable to store data position information relating to selected data groups, these data groups being distributed across the length of the magnetic tape. The storing of selected data position information relating to these selected data groups significantly reduces the resolution of the centralized storage area when employed to locate target data. However, the storing of selected data position information, ranging from the beginning to end of tape, requires less storage capacity and accordingly provides the logical media with an increased capacity useable for non-searching utilities.

The storing of data position information within the centralized storage area is provided using a suitable data table, such a data table being configured to store record data position information and file mark data position information. The arrangement of such logical data position information being such that the logical media is configured to relate a logical data position to a physical data position on the length of magnetic tape. The size of the data table required for storage of data position information is dependent upon the general configuration of the storage system (according to the specific embodiment configured to store data position information relating to substantially all the logical data distributed across length of the tape, and according to a further specific implementation in which data position information is stored only for selected groups of data distributed across length of tape).

Figure 9:
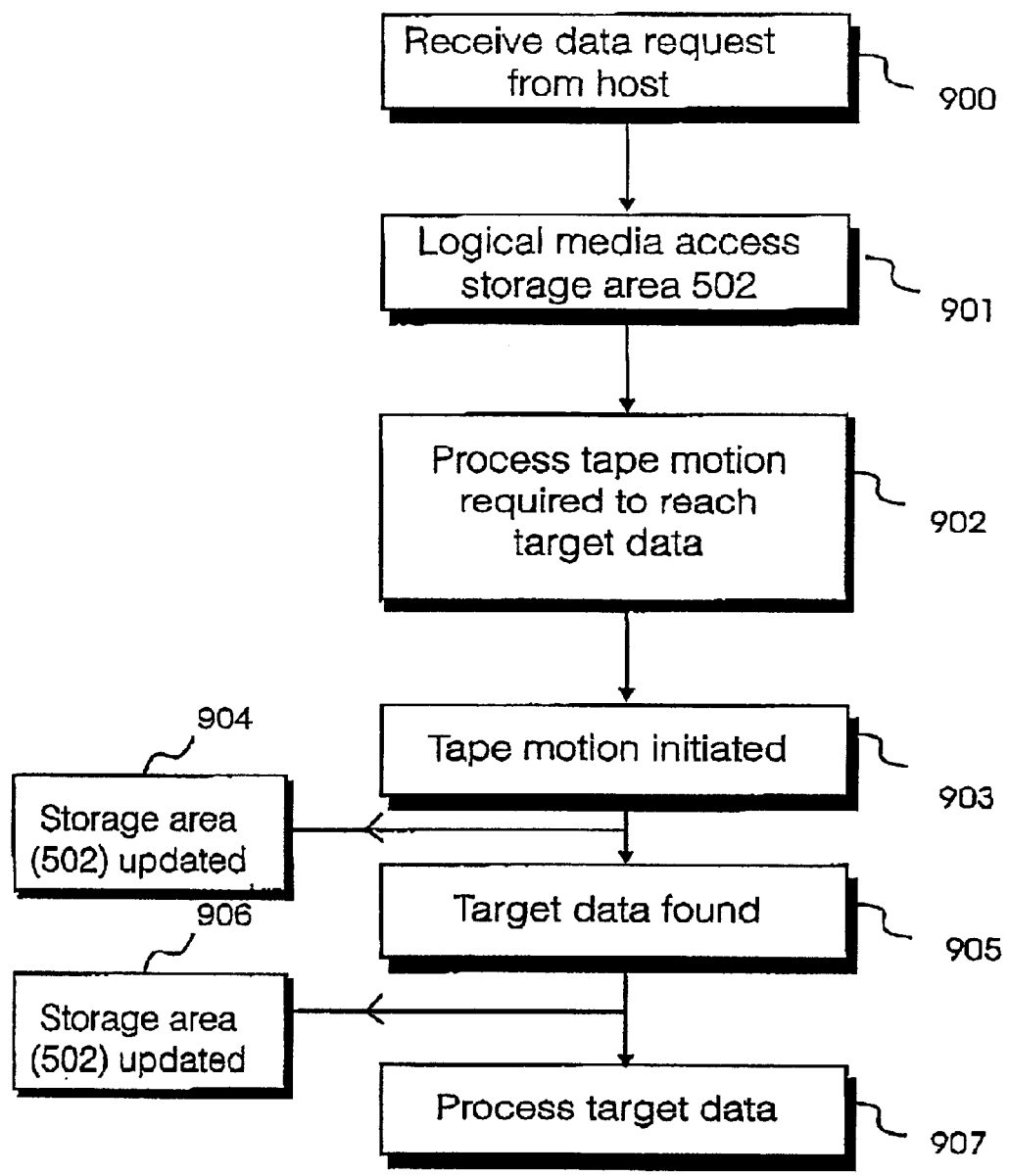
FIG. 9 illustrates a flow diagram detailing the general operational mode according to one specific implementation of the present invention.

FIG. 9 illustrates a flow diagram of the operational mode according to the specific implementation of the invention. Following the writing of data received from a host, onto the magnetic tape data storage medium and the constructing of the updateable centralized data position information storage area 703, a data request is received from a host at stage 900. The data request 900 requires the tape drive, and in particular a read head forming part of the drive, to access the target data and transfer or output this data to the host. The position of the target data on the magnetic tape data storage medium is determined by the logical media and the read head. Using the searching utility 800 within the logical media 702 a tape motion is determined so as to allow the read head to access and output the target data on the magnetic tape at stage 902. The tape motion determined by the logical media 702 is based on the current tape drive position (in terms of the logical positional parameters, these being records and filemarks), logical data position information within the storage area 703, and an estimation of the position of the target data (all data positional information being relative to the BOW). A search algorithm calculates the required tape motion to, for example, change data tracks and access a single or plurality of records (being the target data) within a particular data set located along the length of a data track. The accuracy of the logical media's estimation of the target data position (in terms of logical positional parameters and hence physical positional parameters) is determined by the availability of data position information within the storage area 703—the more data position information available, the more accurate the target data position estimation.

At stage 903 the tape motion via the spool is initiated allowing the tape drive (and in particular the read head) to jump to the exact target data position on the tape, or an area in close proximity to it. The inclusion of the storage area 703 allows the tape drive to displace the magnetic tape at high velocity as a result of the estimation of the target data position, this negates the requirement for the read head to scan the logical data on tape in order to determine the position of the target data, as is common in the art. According to the specific implementation of the present invention when the velocity of tape motion, relative to the tape drive, is at a value less than or equal to a predetermined value at which the read head can operate, the tape drive is operable to read the data from the tape and to write the corresponding data position information to the storage area 703 at stage 904. This feature, according to the specific implementation of the present invention, allows the updateable centralized storage area 703 to be constantly updated with data position information every time a target data request is issued from a suitable host. At stage 905 the target data is located by the tape drive, this data is then written to the storage area 703 as data position information at stage 906 to update the storage area. Such that, in the event of a target data request being made which is identical to a previous target data request, the logical media can determine the exact data position of such target data on the magnetic tape. Finally, the target data is processed at stage 907, such processing being the reading and outputting of this data. The logical media, being configurable as identified above, is operable as a cache memory to provide improved performance of data retrieval over that found in the art.

Figure 10:
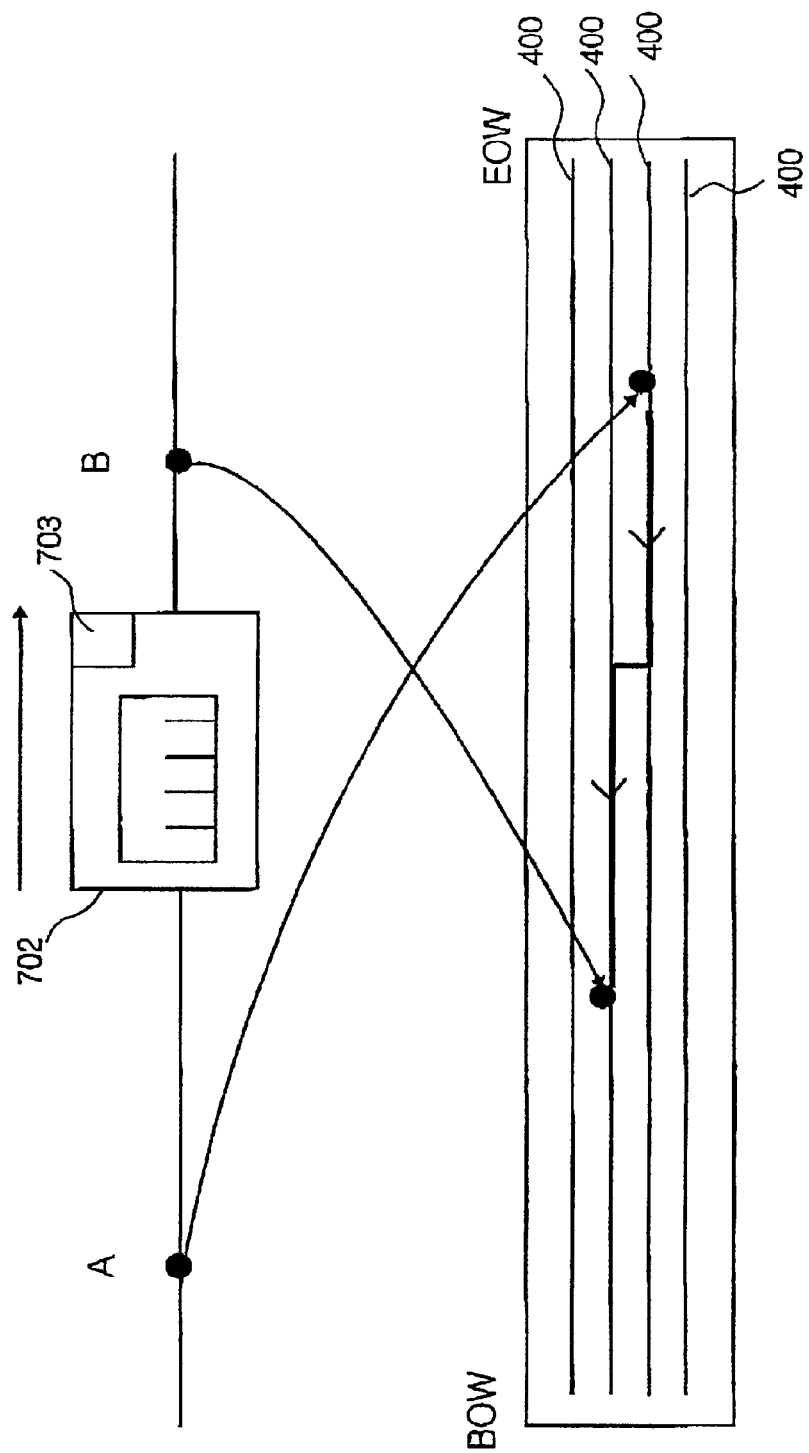
FIG. 10 illustrates the logical and physical relationship between a data start position and a target data position.

Referring to FIG. 10 there is illustrated a logical data position of target data B relative to a starting logical data position A together with the actual physical data positions of B and A on a length of magnetic tape. The logical media 702 is illustrated in FIG. 8, having just received a target data request from a host and as such, following the estimation of the target data position (B), moves from starting logical data position A to this new position B.

In terms of the physical data position of B relative to A on the magnetic tape, and as illustrated in FIG. 8 the logical media, and in particular, the read head must traverse back from position A along a data track 400, swap data tracks and continue traversing back towards the beginning of wrap or tape (BOW) arriving ultimately at position B. The logical media 702, according to the specific implementation of the present invention determines the physical data position of the target data with reference to a data set number and track number and also determines the logical data position with reference to a record number and a filemark number. The traversing of the logical media from physical position A to physical position B, as illustrated in FIG. 8, is possible due to the data position information contained in the updateable centralized data position information storage area 703—this area containing useful data position information to determine the target data position B. When the storage area 703 is devoid of data position information, for example, following the initial writing of data to the magnetic tape, the logical media is only provided with a starting position A from which to determine a likely data position of B. In this event, the logical media 702 must perform a series of iterative read and write operations to accumulate more data upon which to base an estimation of the likely target data position. As a result of the iterative read and write operations the storage area 703 is dynamically constructed with data position information such that the determination of the target data position, following a request from a host, is more accurate due to the increased data position statistics available when processing a data position estimation. It can be appreciated that as the storage area 703 accumulates data position information the efficiency with which the logical media can determine a target data position and hence the speed with which it can retrieve data, following receipt of a target data request, is increased such that when the storage area 703 is completely filled with data position information relating to data on the magnetic tape, its determination of the logical and physical position of target data is 100% accurate resulting in a single read operation.

Figure 11A:
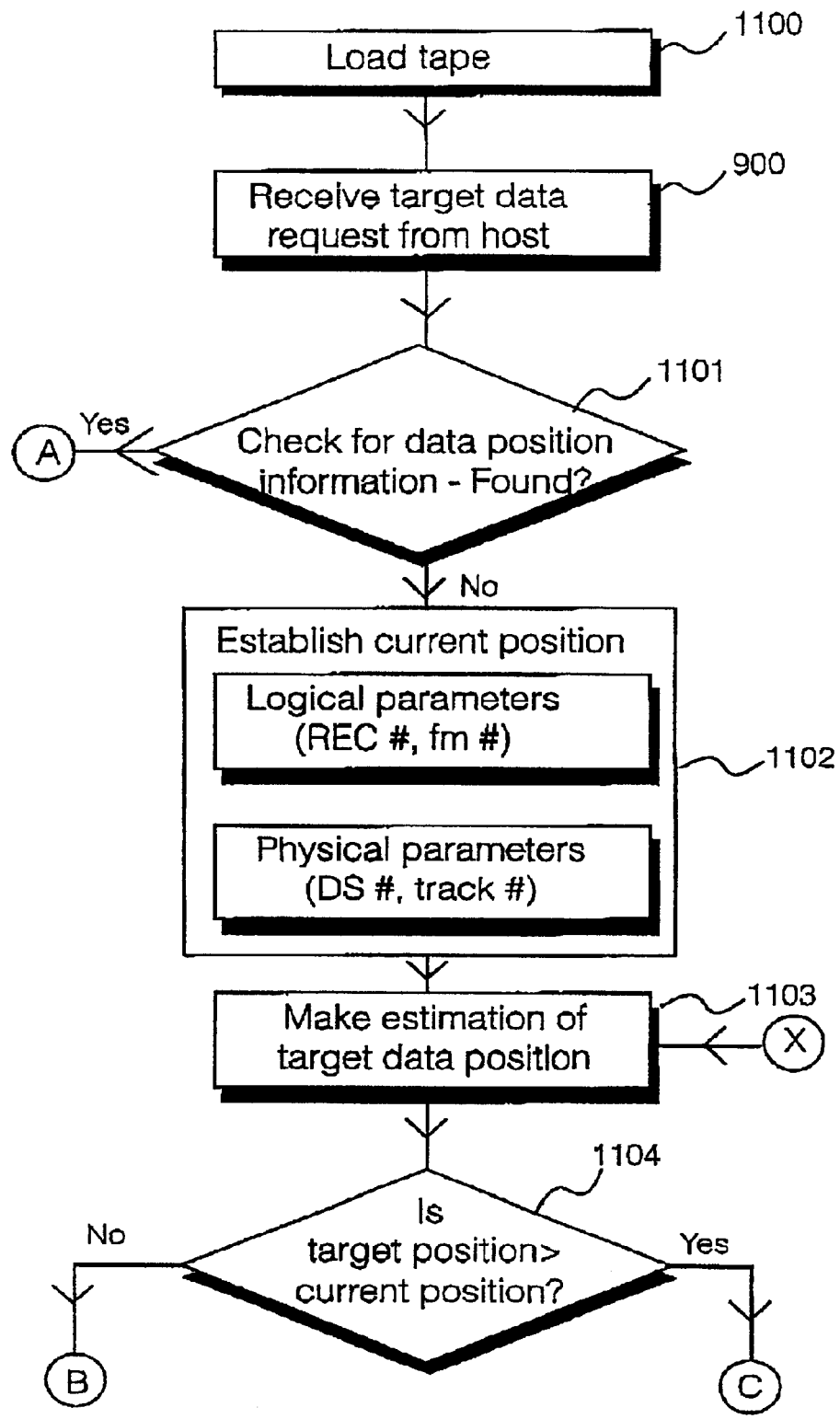
FIG. 11a illustrates a flow diagram detailing the initial stages of a search algorithm according to a specific implementation of the present invention.
Figure 11B:
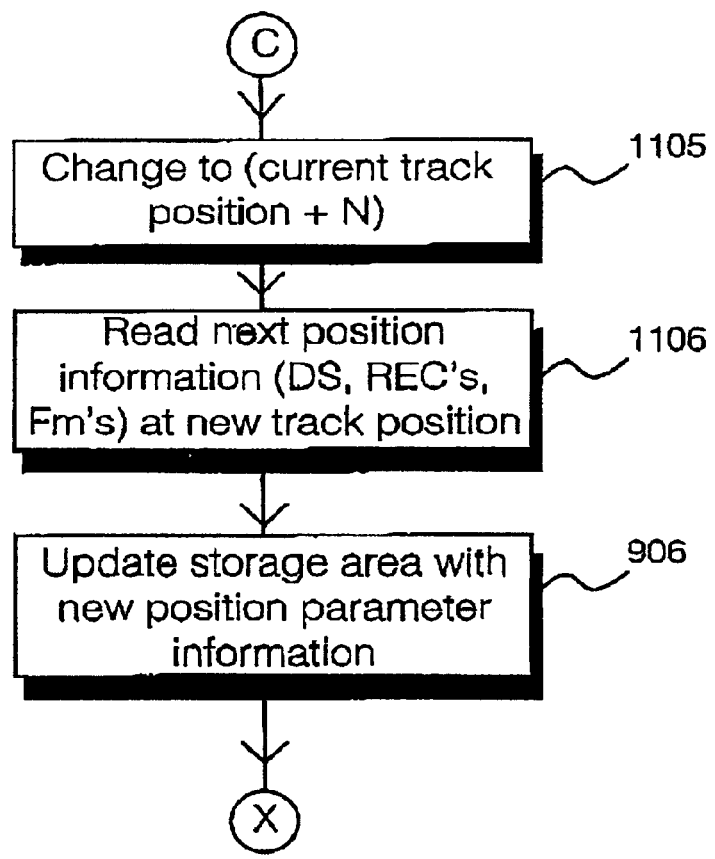
FIG. 11b illustrates a continuation of the flow diagram as detailed in FIG. 9a according to a specific implementation of the present invention.

Referring to FIG. 11a there is illustrated a flow diagram detailing the initial stages of data retrieval by the logical media from a magnetic tape data storage medium. In operation, initially a tape is loaded onto the data storage medium at stage 1100. Data is then received from a host and processed according to the steps detailed in FIG. 7 involving the compression of data into a logical data format 701 and the formatting into physically partitioned data using pipeline 704. A data request is then received by the tape head from a host at stage 1100. Logical media 702 then checks the storage area 703 to determine the amount of data position information available to facilitate the most accurate determination of the target data position in terms of logical and physical data positional parameters. According to the specific implementation described herein, the check of the storage area 703 at stage 1101 reveals a storage area devoid of data position information. The logical media 702 establishes the current position at stage 1102, the current position being in terms of logical data position parameters (record number and filemark number) and physical data position parameters (data set number and track number). The determination of the current position being conducted by the engagement of the read head forming part of the tape drive. The logical media then makes an estimation of the target data position at stage 1103 based on the current position parameters and any useful data position information within the storage area 703. As indicated above, the more data position information available to the logical media when determining or estimating the target data position, the more accurate the resultant estimation and hence an improved data retrieval speed. The estimated target position is then compared with the current position at stage 1104 if the estimated target position is greater than the current position the logical media, via the tape drive changes its current position on a particular data track to this track number+N, as detailed in FIG. 11b. Where N is an integer dependent upon the physical layout of data tracks on the magnetic tape. For example, the formatting of data tracks on the tape according to the present invention, may take the form of a series of parallel tracks running the length of the tape or a squashed square spiral in which data is first written onto the centre of the tape such that subsequently written data extends out from this central position in a square spiral. For example, and having data physically formatted on the tape in a parallel data track format, and estimated logical data position may be a factor of 10 greater than the current logical position of the tape drive on the magnetic tape, and as such a track position shift of N=4 may be appropriate. Following the change of track number at stage 1105 as detailed in FIG. 11b the new data position of the logical media 702 on the tape is read, this data being processed by the logical media into data position information in terms of logical and physical data position parameters on the new track position at stage 1106. The storage area is then updated with this new data position information at stage 906. The target data position is then estimated again at stage 1104 (FIG. 11a) having the benefit of the newly processed data position information obtained at stage 1106 (FIG. 11b).

Figure 11C:
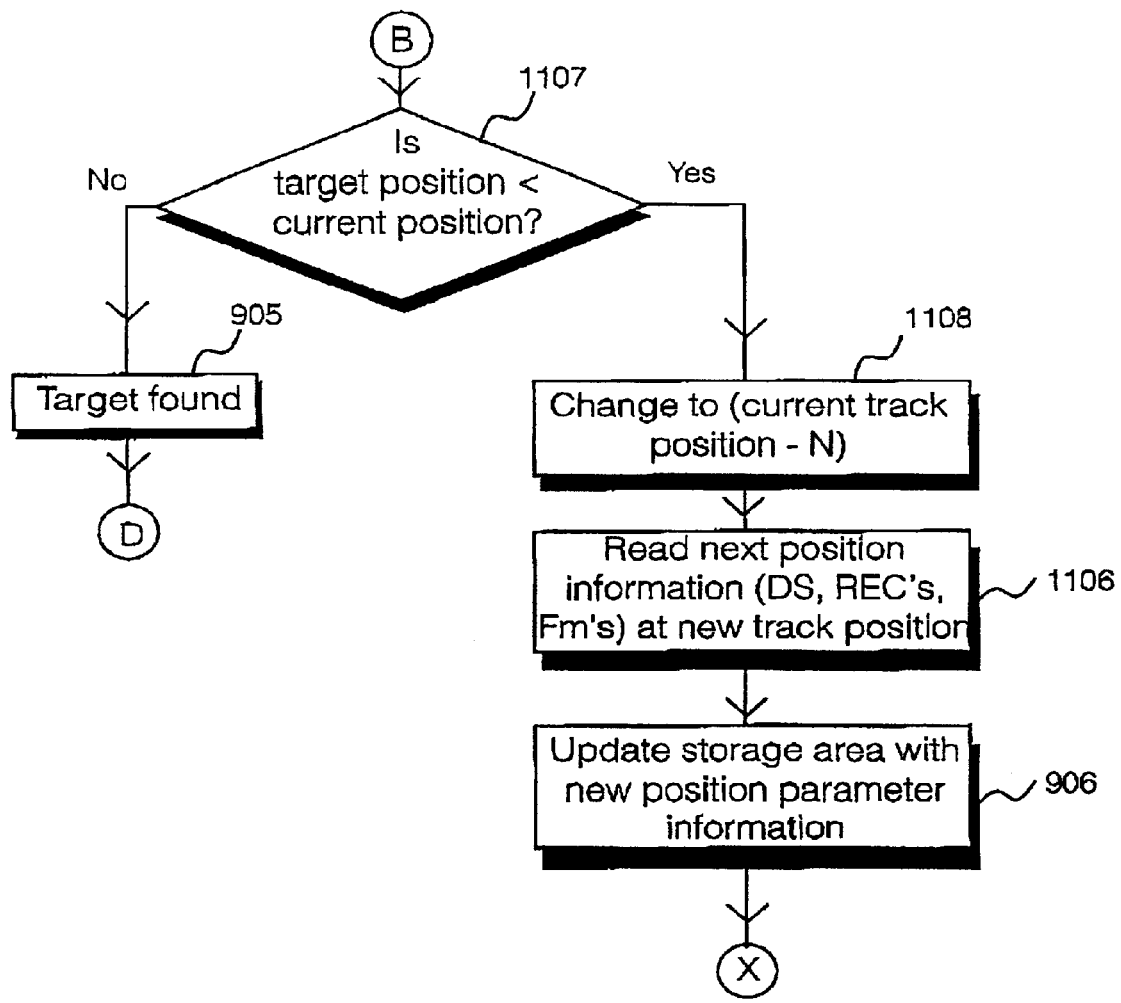
FIG. 11c illustrates a further continuation of the flow diagram as detailed in FIG. 9a according to a specific implementation of the present invention.

The estimated target position in then compared with the current position at stage 1104 if the estimated target data position is found to be not greater than the current position the logical media determines if the target position is less than the current position at stage 1107 detailed on FIG. 11c. If the target data position is found to be less than the current position the logical media determines that the tape drive should change position to its current track number to a track number—N. Such a change in track number being dependent upon the difference between the current position and the estimated target data position and the data track formatting applied to the data on the magnetic tape. Following the change of track position at stage 1108 the read head of the tape drive reads the new current position in terms of logical data position parameters and determines the corresponding physical data position parameters at stage 1106. The storage area is then updated with the new data position information at stage 906 to aid any future target data position estimations.

Figure 11D:
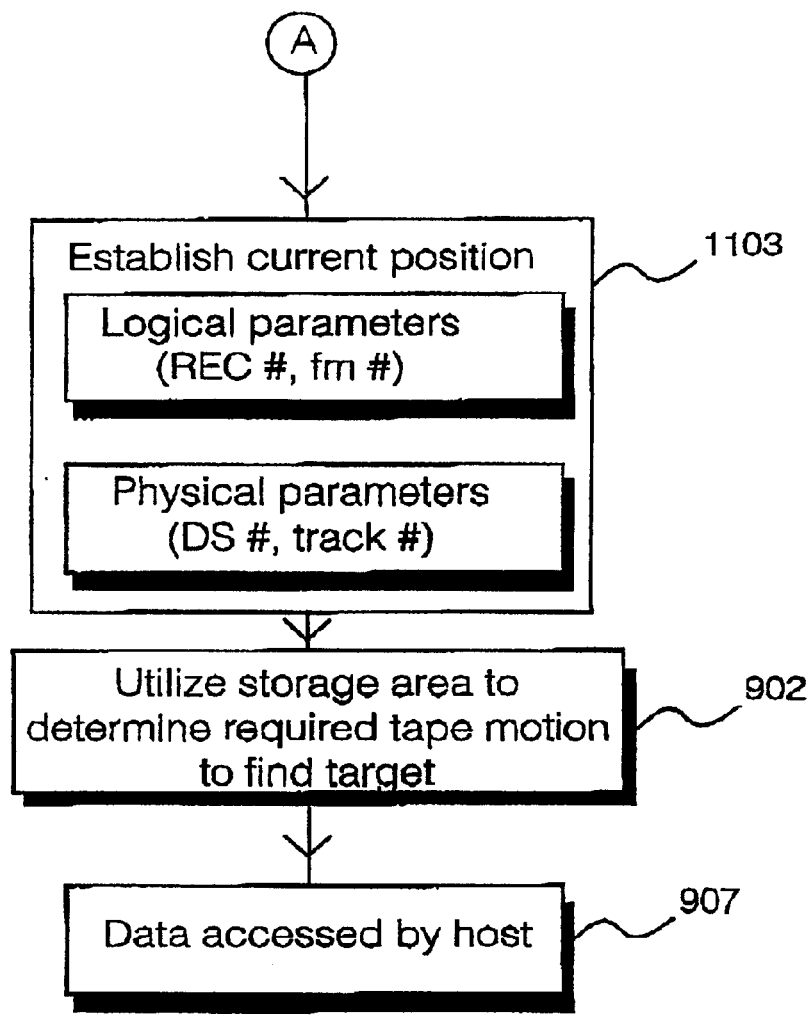
FIG. 11d illustrates a further continuation of the flow diagram as detailed in FIG. 9a according to a specific implementation of the present invention.

As detailed in FIG. 11a upon checking for data position information at stage 1101, if it is found that the storage area 703 contains data position information relating to substantially all data recorded and distributed across the length of tape, the logical media establishes its current position in terms of logical and physical parameters as detailed in FIG. 11d at stage 1103. Logical media 702 is then configured to utilize the data position information contained within the storage area to determine a required tape motion to enable the target data to be read by the tape head at stage 902. When the read head is positioned on the target data the data is then read by the tape drive and transferred to the host, the target data effectively being accessed by the host at stage 907.

Referring to FIGS. 11a and 11c if it is found that the estimated target position is not greater than the current position at stage 1104 and also that the estimated target position is not less than the current position at stage 1107 the only available outcome is that the current position of the tape drive is at the target data stage 1105.

Figure 11E:
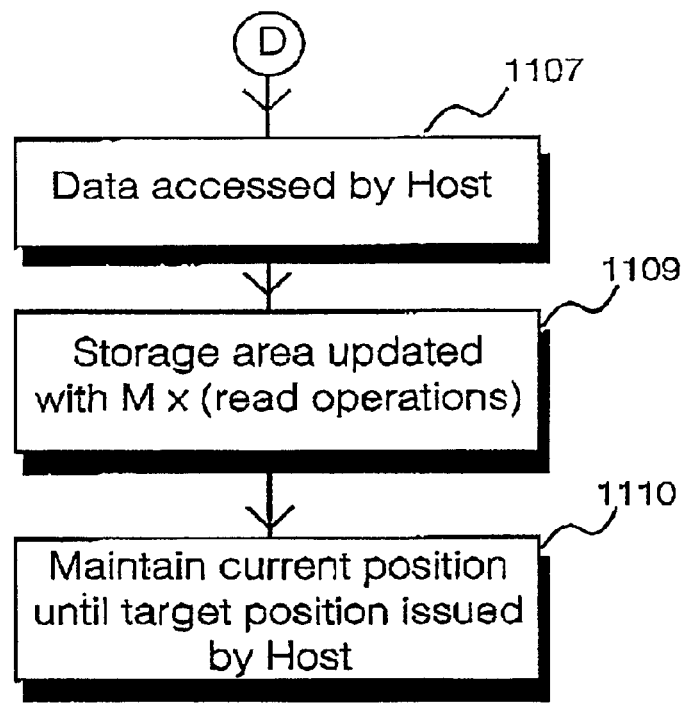
FIG. 11e illustrates a further continuation of the flow diagram as detailed in FIG. 9c according to a specific implementation of the present invention.

Referring to FIG. 11e the data is then accessed by the host at stage 907. This is following the above operational stages involving the logical media accessing data following a data request from a host the result of such data reading and updating is the storage area being updated with M×read operations, where M is the number of data read operations encountered during a single target data access operation. The logical media then maintains its current position until a new data request for a specific target data is issued by the host at stage 1110.

It will be appreciated that as the logical media undertakes the stages as detailed in FIGS. 11a–e, (in the event of an initially blank storage area 703) the data position information is gradually accumulated in this area following the data read and update operations carried out during a single target data access operation. In such a scenario, it is envisaged that a tape head would initially traverse many data tracks, performing multiple data read operations in an attempt to locate the target data, whereby the storage area is rapidly filled with data position information. As the storage area accumulates data, subsequent target data access requests, having the benefit of the aforementioned multiple data read and storage area update operations, are processed more quickly as the read head, and in particular the logical media is not required to perform as many iterative data read and storage area update operations. Therefore, the efficiency of the search algorithm as detailed in FIGS. 11a–e, is heavily dependent upon the availability of data position information contained within the storage area 703 (the more data available the more efficient the data access operation as a result of the reduced read and data update operations).

Figure 12:
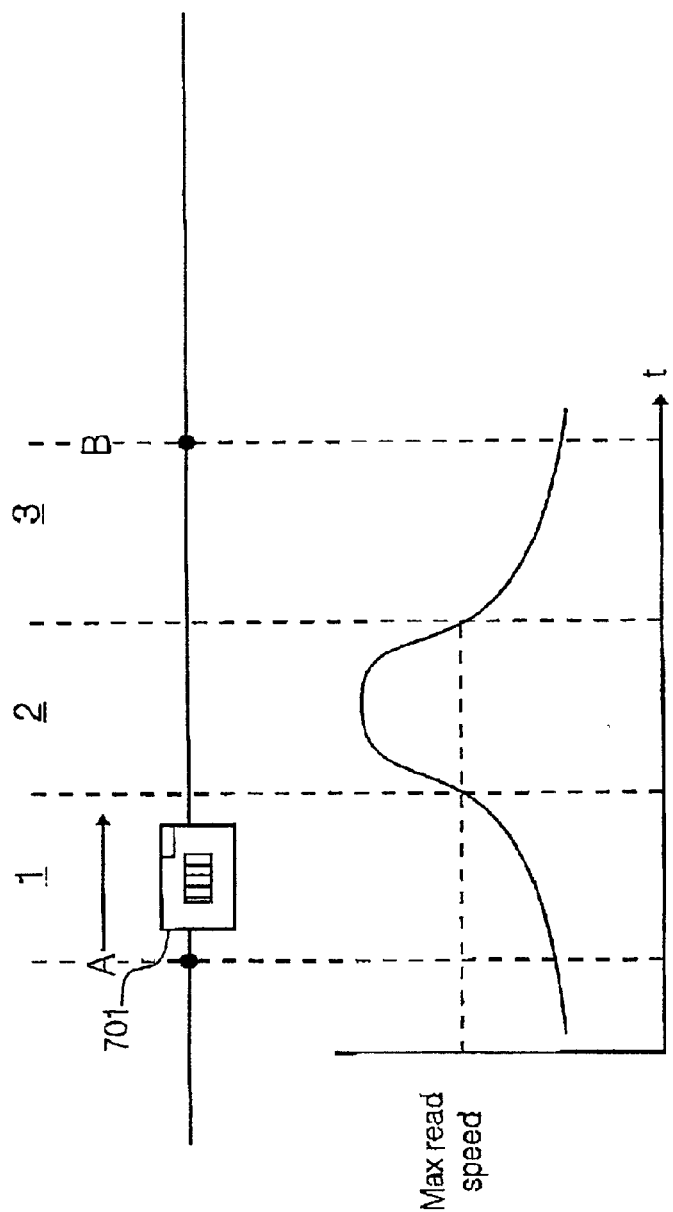
FIG. 12 illustrates three different environments in which data position information may or may not be written to the centralized storage area.

FIG. 12 illustrates the various operational conditions under which the logical media can read data and accordingly update the centralized storage area 703. The logical media is illustrated in FIG. 12 as traversing from start position A to a target data position B having greater logical data values than A. Utilising the search algorithm as detailed in FIGS. 11a–e, the logical media calculates the estimated data position of target data B on the tape. The tape drive displaces the tape via the spool so as to position the read head over the target data. To provide the undertaking of efficient and rapid data access operations, the tape is configured for rapid displacement so as to minimize the time taken for the tape drive to travel from a start position A to the final target data position B. According to the specific implementation of the present invention the drive head accelerates the spool and accordingly the tape from the start position to the data target position. This is illustrated in FIG. 12 where the logical media 702 is exposed to 3 different environments with regard to the motion of the tape. In region 1 the tape is accelerated away from the start position, the logical media then enters a second region 2 in which the highest velocity of tape motion is experienced. Following a peak in the velocity the tape motion decelerates and the logical media enters a third region 3 in which ultimately the tape motion is arrested at the target data position.

Figure 1:
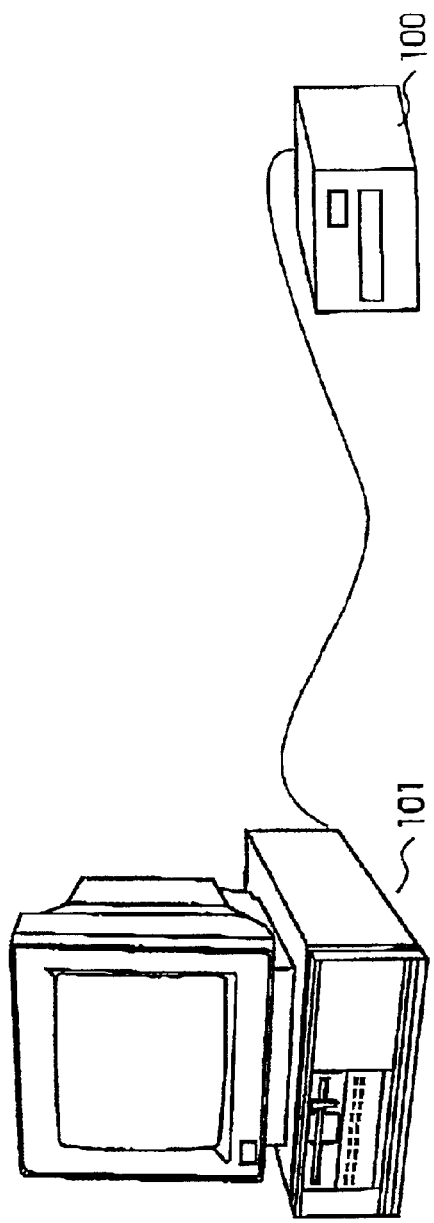
FIG. 1 illustrates a tape data storage device connected to a host.
Figure 2:
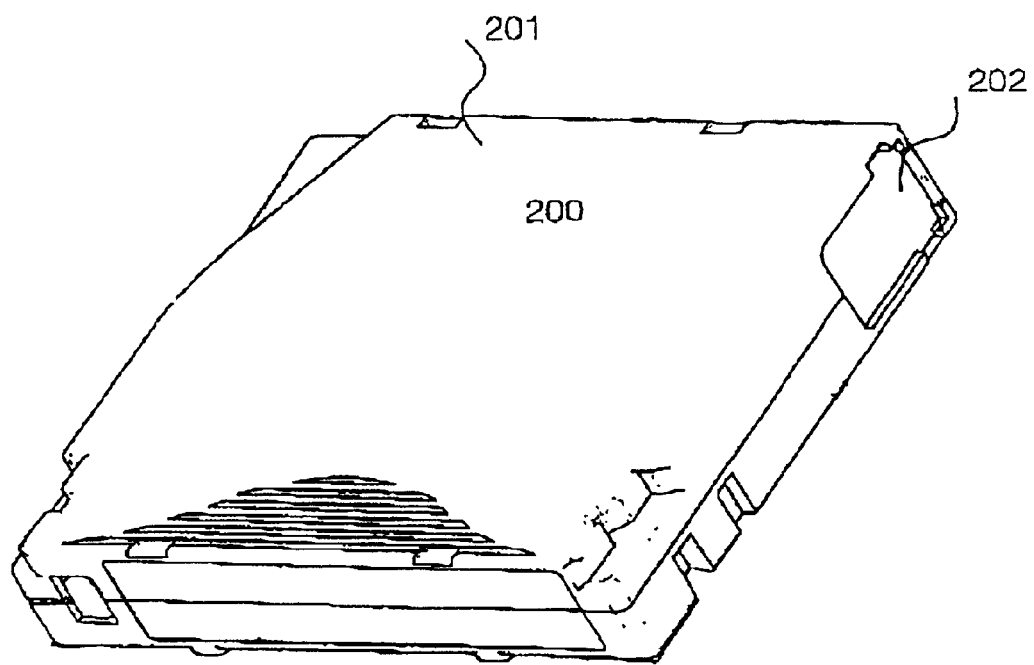
FIG. 2 illustrates schematically a tape data storage cartridge of a single reel type, containing an elongate magnetic tape data storage medium.
Figure 3:
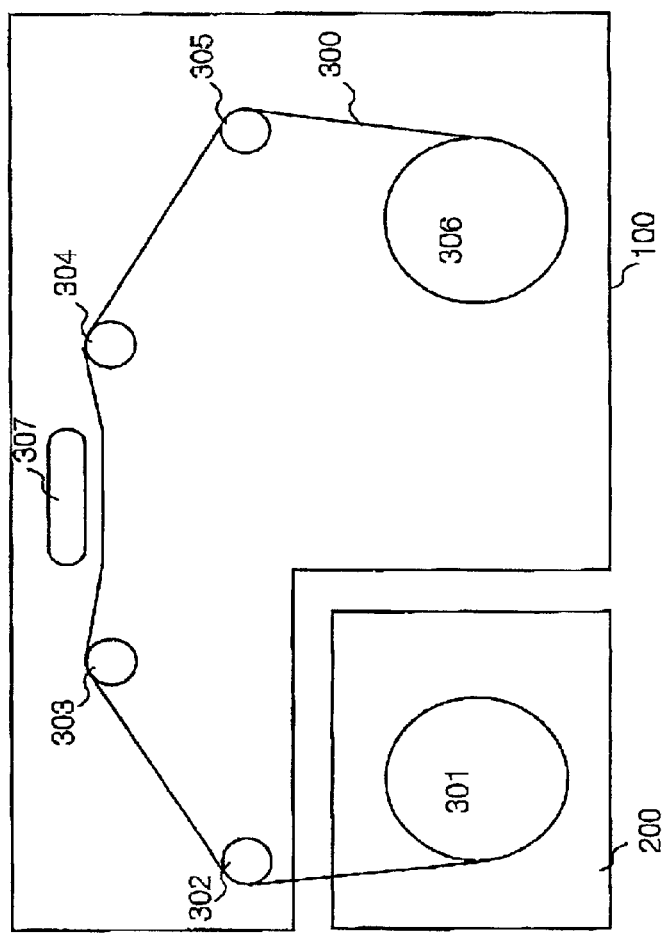
FIG. 3 illustrates schematically operation of a tape data storage device, for reading/writing data to a tape data storage medium inserted into the device, as is known in the prior art.
Figure 4:
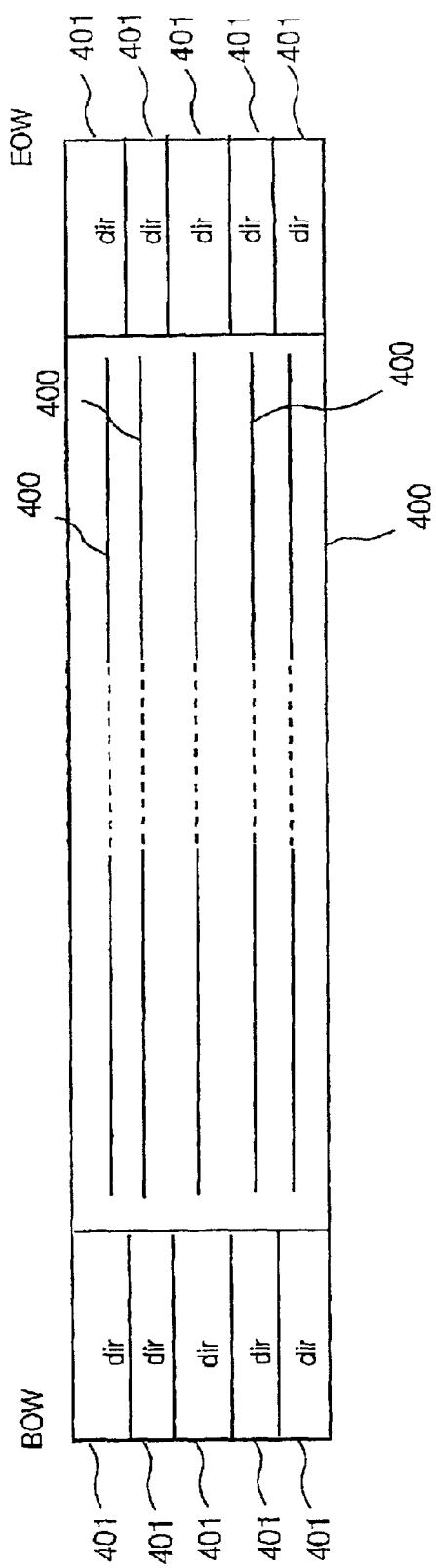
FIG. 4 illustrates a length of prior art magnetic tape configured to store logical data and logical data position information.
Figure 5:
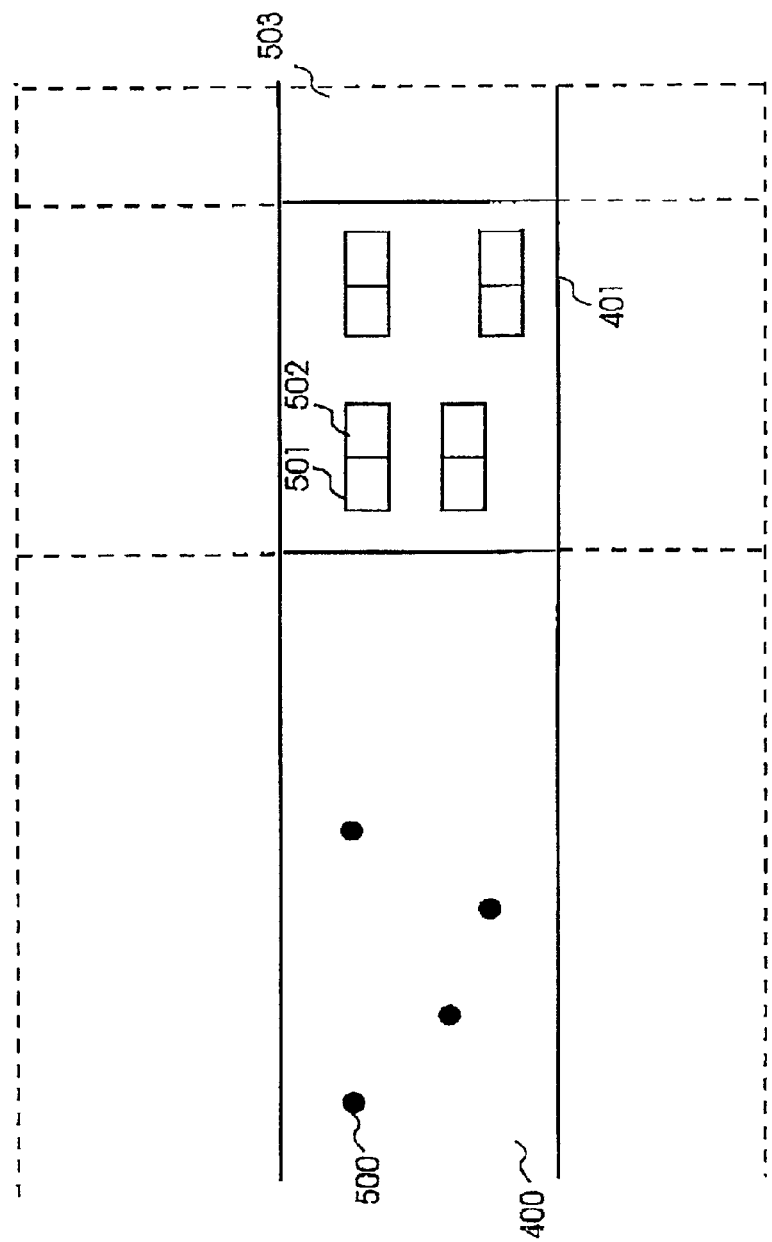
FIG. 5 illustrates the arrangement of data position information storage within a prior art data storage device.
Figure 6:
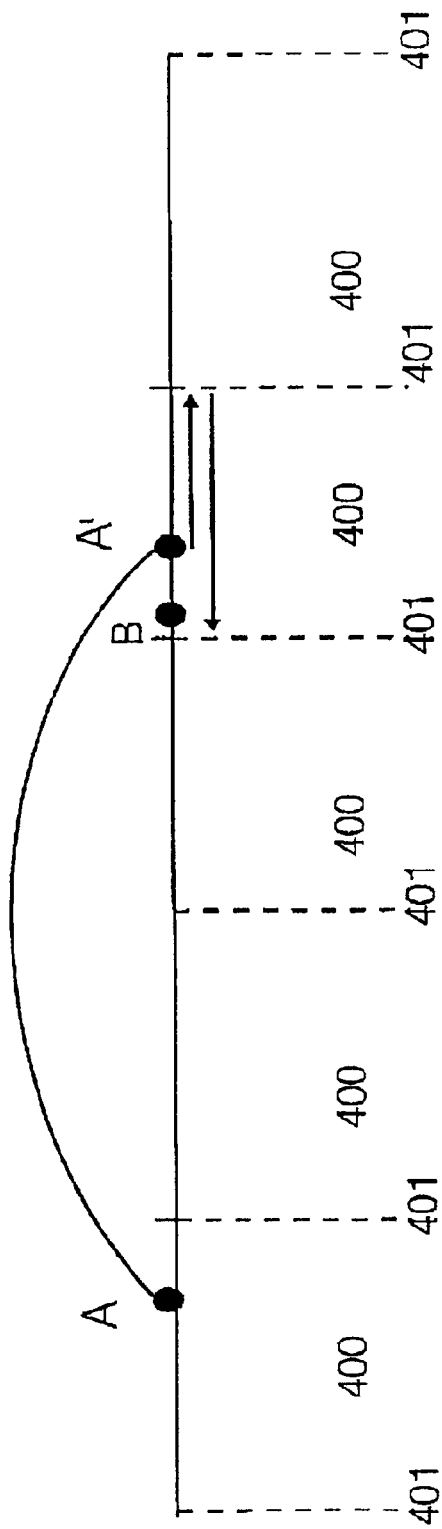
FIG. 6 illustrates an operational mode of a prior art data storage device being operable to access data following a data request from a host.

According to the specific implementation of the present invention the read head is configurable to read data whenever the velocity by which the data is transported passed the read head is below a predetermined value. This provides for rapid data access times as the magnetic tape data storage system is not limited to searching for data at relatively low read speeds. The velocity with which the tape is displaced in prior art magnetic tape storage systems is commonly limited to a read speed of the read head due to the continual iterative data read searching as detailed above with reference to FIG. 6.

According to the specific implementation of the present invention, following the receipt of a data request from a host with target data at position B, the tape is accelerated from start position A such that in first region 1 data is read from the tape and the storage area 703 is updated with this data position information. Utilizing a store algorithm configured to update the storage area with non-target data position information, such an algorithm being termed a second store algorithm. Upon entering region 2 the tape is moving with a velocity too great for the read head to process data and accordingly the storage area 703 is not updated when the tape is moving at these elevated velocities. At substantially the mid-point between the start position A and the final target data position B the tape velocity is at a maximum after which point it begins to decelerate such that in third region 3 and upon approach of the target data position, the read head of the tape drive is allowed to read data and update the updateable centralized data storage area 703, again utilizing the store algorithm concerned with non-target data. According to the specific implementation of the present invention the tape drive is configured to disable the read head when the storage area 703 is completely full of data position information such that subsequent read and data position information updates are not required. Upon reaching the target data a separate store algorithm is configured to update the storage area with data position information relating to the target data and estimated or approximated target data, such an algorithm being termed a first store algorithm.

Figure 13:
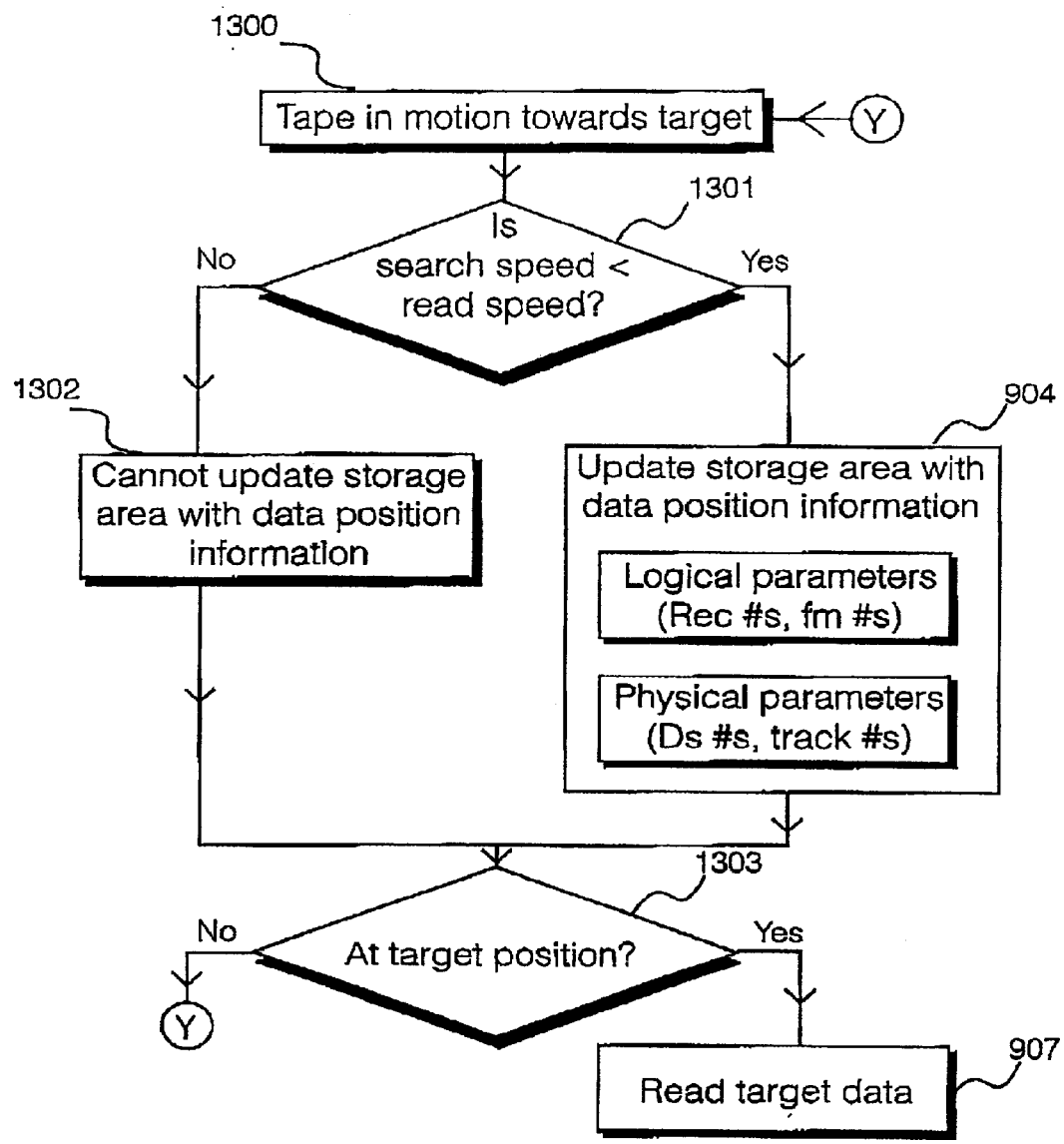
FIG. 13 illustrates a flow diagram detailing the requirements necessary to allow the centralized storage area to be updated.

Referring to FIG. 13 there is illustrated a flow diagram detailing the general operational nature of the store algorithms in which stage 1300 is preceded by the receiving of a target data command issued by a host. The tape is then accelerated to the target at stage 1300. The second store algorithm determines if the search speed is less than or equal to the read speed at stage 1301. If the search speed or tape velocity is less than or equal to the read speed (regions 1 and 3 as detailed in FIG. 12) the updateable centralized storage information area 703 is updated with data position information as a result of the read head of the tape drive reading data from the tape at stage 904. This data position information being in terms of logical parameters (records and filemarks) and physical parameters (data sets and data tracks). If the search speed, or tape velocity, is greater than the read speed of the read head (as detailed in region 2 of FIG. 12) the storage area 703 cannot be updated with data position information as illustrated at stage 1302.

The logical media 702 then determines using the search algorithm detailed above with reference to FIG. 11a–e, if the tape head position on the tape is at the target data position stage 1303. If the search algorithm determines that the current position is not the required target data position at least one further iteration is performed and the tape motion is resumed towards a new target data position. If the search algorithm determines that the current position is the target data position then the read head proceeds to read the data and relay this data to the host at stage 907, the first store algorithm then updates the storage area with target data position information.

Figure 14:
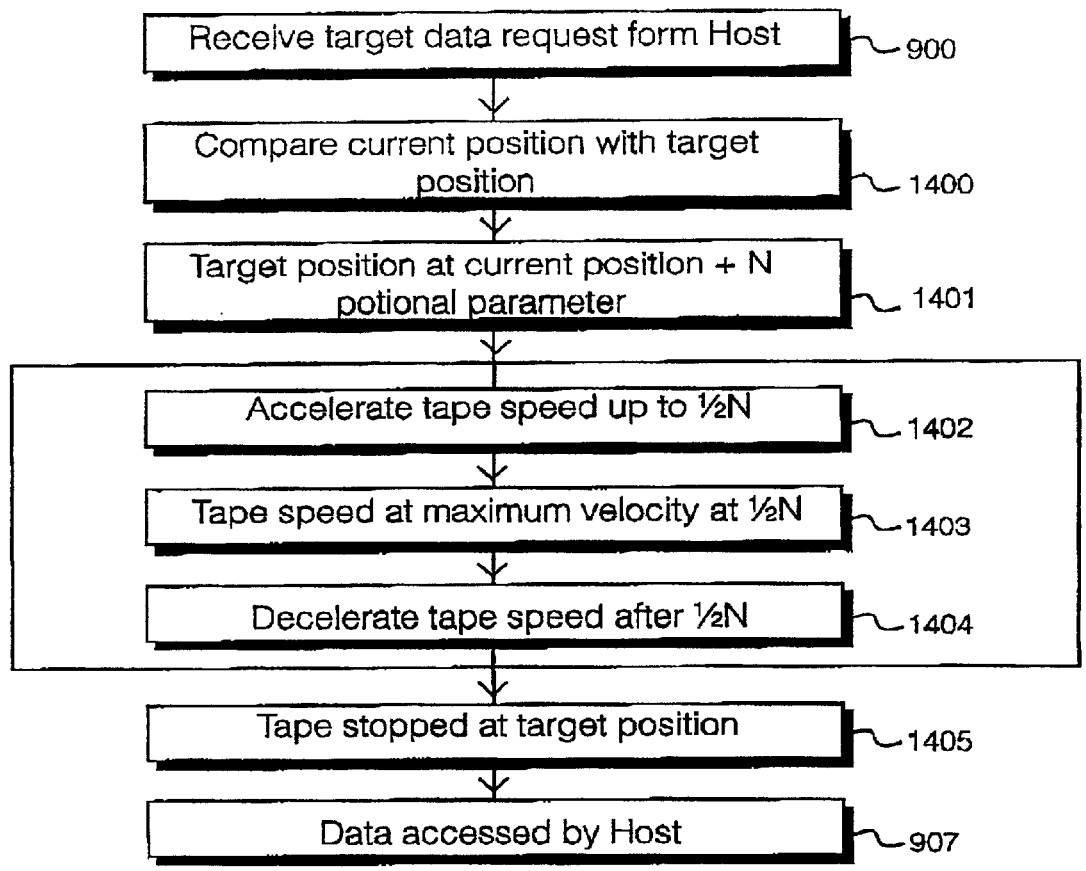
FIG. 14 illustrates a flow diagram detailing the operational mode according to one aspect of the present invention following the receipt of a target data request from a host.

Referring to FIG. 14 there is illustrated an overview of the tape motion during a target data access request command issued by a host. The logical media receives a target data request from a host at stage 900. The position of the tape drive and logical media 702 is then compared with the position of the target data on the tape at stage 1400. In this specific embodiment the target data position is at a current position+N positional parameters (logical and physical) at stage 1401. The tape is then displaced in stages 1402 to 1404, in particular the tape being accelerated up to ½ N at stage 1402 as detailed with reference to FIG. 12. The tape speed reaches a maximum velocity at ½ N at stage 1403 whereupon the speed is decelerated at stage 1404. The motion of the tape is then arrested at the target position 1405 whereby the data is accessed by the read head and relayed to a host at stage 907.

Figure 15:
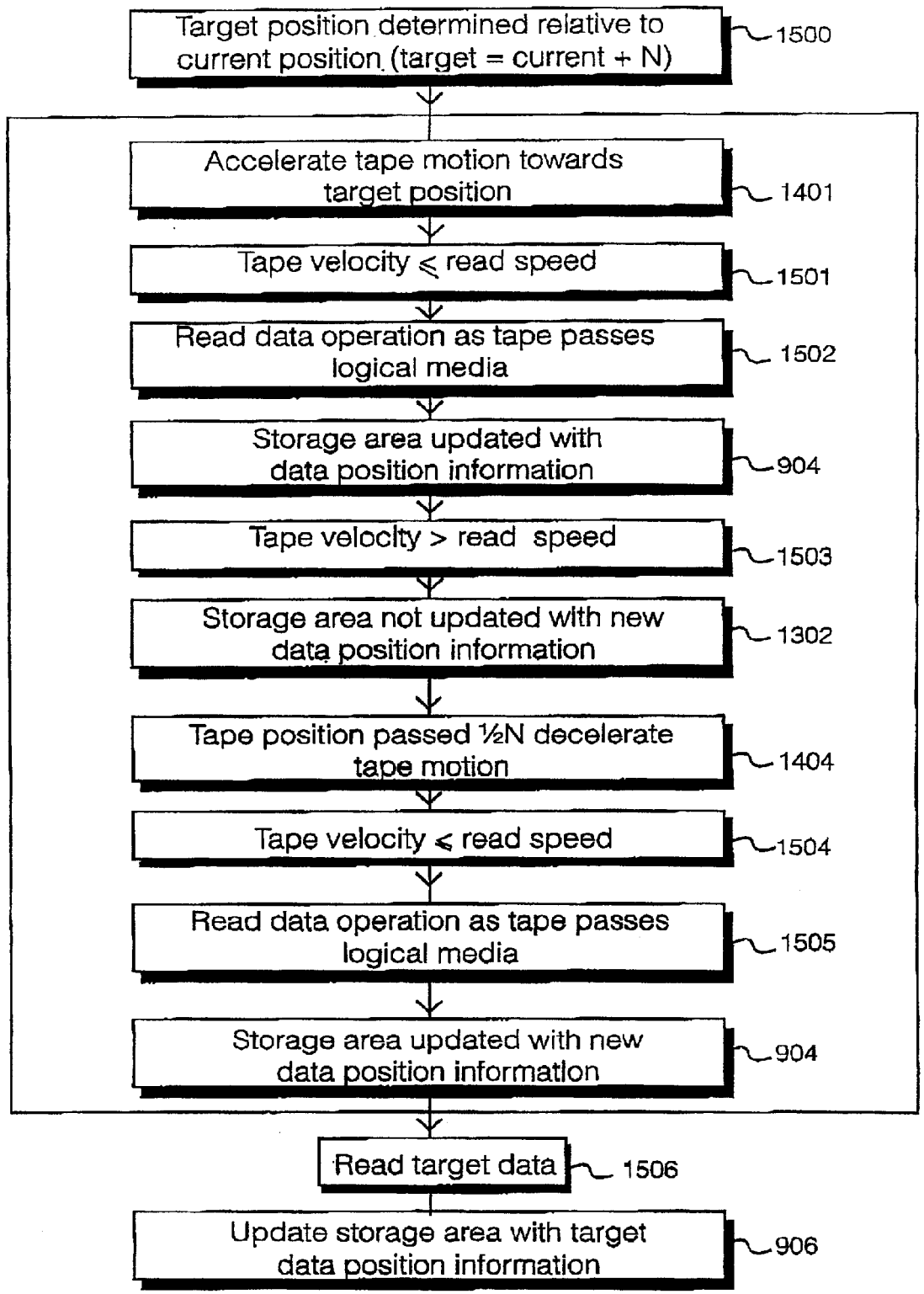
FIG. 15 illustrates a flow diagram detailing the various stages associated with the updating of the centralized storage area during a single data access operation.

Referring to FIG. 15 there is illustrated a flow diagram detailing the various stages of a data access operation following the receipt of a target data command issued by a host. At stage 1500 a target data position is determined relative to a current position, the target position being equal to the current position+N. The target data position being determined by the search algorithm as detailed with reference to FIG. 11a–e. The tape motion is accelerated towards the target position at stage 1401 such that the tape velocity is initially less than or equal to the read speed capabilities of the read head within the tape drive at stage 1502. Due to this initial relatively slow tape motion the read head is operational to read data as the tape passes the logical media at stage 1502. The updateable centralized data storage area 703 is then updated with the newly read data position information at stage 904. When the velocity of the tape is accelerated above the maximum read speed of the read head at stage 1303 and as illustrated in region 2 with reference to FIG. 12, the storage area cannot be updated with the new data position information as illustrated at stage 1302. Upon passing through tape position ½ N the tape velocity reaches a maximum and then proceeds to decelerate at stage 1404. When the tape velocity has slowed to a value at or below the maximum read speed capabilities of the read head at stage 1504 the read head is capable of reading data as the tape displaces at stage 1505. Due to the availability of the read operation at stage 1505 the storage area is updated with data position information at stage 904. The reading of data and the updating of the updateable centralized data storage area 703 when the tape is in motion is controlled by a second store algorithm which is operable to update the storage area 703 with non-targeted data having non-targeted data position information. This is in contrast to a first store algorithm which is operable to update the storage area 703 with target data position information accumulated by reading target data as illustrated at stage 1506. Following the reading of such target data the storage area is updated with the corresponding target data position information at stage 906.

It is perceivable that, in the event of an incomplete storage area, the estimated target data position determined initially by the search algorithm, is not the actual target data required by the host. This is a result of the search algorithm performing a best guess or estimation of the target data position given the limited statistics available for data positional calculation. The first store algorithm works in tandem with the second store algorithm such that the second store algorithm is operable to store data position information for non-targeted data as the tape is displaced relative to the tape drive the first store algorithm updating the storage area with data position information relating to the target data arrived at following a displacement of the tape. The second store algorithm, relating to non-targeted data may be considered to run continuously in the event of tape motion being at a velocity less than a pre-determined value dictated by the read capabilities of a read head.

The first store algorithm operating on target data only, is expected to perform multiple storage area updates in the event of multiple target data position estimations undertaken by the search algorithm in a single data access operation following the receipt of a data request issued by a host. The first store algorithm performing a final storage area update during a single target data access operation when the target data position estimation obtained from the search algorithm is equal to the actual target data position on the tape. As indicated above, as the storage area 703 accumulates data position information utilization of the first and second store algorithms is decreased as the position of the target data on the tape is more accurately determined by the search algorithm having the benefit of increased data position statistics.

Figure 16:
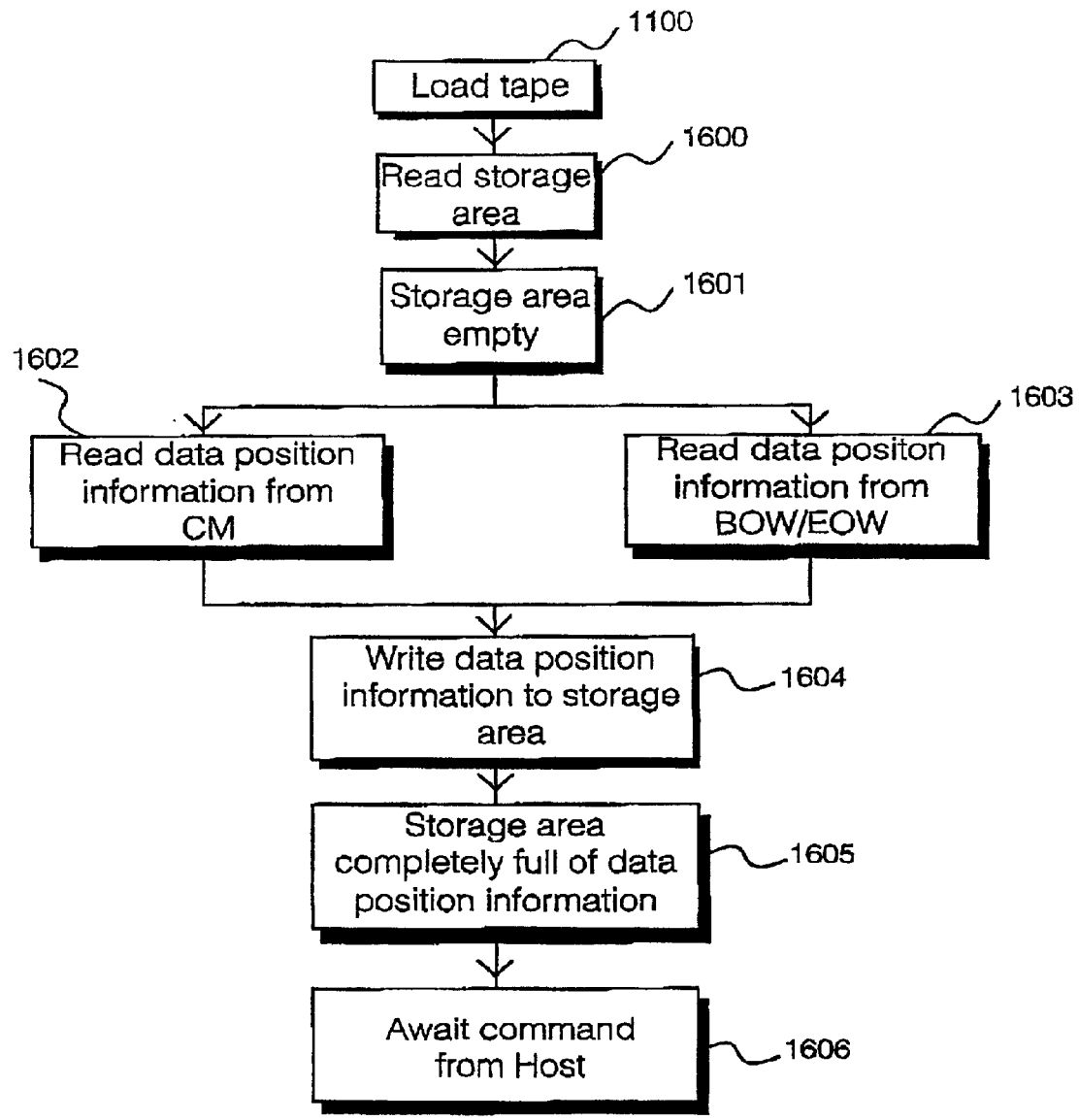
FIG. 16 illustrates, according to further specific implementations of the present invention, the loading of data position information into the centralized storage area.

Referring to FIG. 16 herein, in a further specific implementation of the present invention the magnetic tape data storage system as detailed above is configurable for the loading and unloading of data position information from a reserve storage area is indicated. The tape is first loaded into the storage system at stage 1100, the storage area 703 within the logical media 702 is then accessed at stage 1600 to confirm the absence of data position information 1601. In the event of the storage area containing data position information relating to data stored on tape, data position information is not loaded from the reserve storage area so as to not lose any data position information that may have been accumulated in the storage area by the iterative data position information update as detailed with reference to FIGS. 9–15. The data position information is then transferred from a reserved storage area as detailed at stages 1602 and 1603 according to further specific implementations of the present invention. At stage 1602 data is transferred from a cartridge memory data storage device such that the data position information transferred from the cartridge device corresponds to the data recorded along the length of the tape within the tape system. In a further specific implementation of the present invention the data position information relating to data recorded on tape is transferred from the individual directories located at the BOW and EOW. The transferring of the data position information into the updateable centralized data storage area 703 is complete when the information is written to a data table forming the storage area 703 at stage 1604. The storage area is fully loaded with data position information relating to data recorded onto the tape at stage 1605. The magnetic tape data storage system then being configured to access data following the receipt of a target data commands issued by a host 1606.

As will be appreciated by those skilled in the art, the specific and further implementations of the present invention are configured for operation when utilized in a storage system in which the tape drive is displaceable relative to the magnetic tape medium. Such a system, utilizing a static tape with displaceable tape drive is operative to locate a target data, following a request from a host, due to the availability of data being able to be transported passed the read head of the tape drive.

The transporting of logical data passed the read head is common to both operational methods of the storage system described herein, in which the tape drive is static and the magnetic tape is displaceable, and a system in which the tape drive is displaceable and the magnetic tape is static.

What is claimed is:

1. A method of centralized data position information storage, comprising the steps of:

arranging a byte stream of data into partitioned logical data;

storing data position information relating to said logical data in an updateable centralized storage area;

utilizing said information to locate target data that is part of said logical data; and storing said data position information in said storage area, said step of storing said data position information comprising:

applying a first store algorithm to said target data to update said storage area with target data position information; and applying a second store algorithm to non-target data to update said storage area with non-target data position information.

2. The method as claimed in claim 1, wherein:

said first and said second algorithms are operable to store said data position information in a data table; and said data table is configurable to store data position information relating to said logical data, said logical data comprising records and filemarks.

3. The method as claimed in claim 1 wherein said step of utilizing said data position information comprises applying a search algorithm to said data position information, said search algorithm being configured to locate said target data.

4. A method of updating data position information on a tape storage device, said method comprising the steps of:

arranging a byte stream of data into partitioned logical data and recording said data onto a length of tape;

storing data position information relating to said logical data in an updateable centralized storage area;

determining a required transporting of said logical data past a read head by utilizing said information;

reading, from said tape with the read head, target data by using the determination required transporting, said target data being part of said logical data;

updating said storage area with data position information obtained following transporting of said logical data past said read head, the step of updating said storage area comprising:

(a) reading said logical data on said tape by using said read head; said read head being configurable for said reading of said data in response to the velocity of said logical data being transported past said read head being below a predetermined value; and (b) writing said data position information to said storage area;

the step of updating said storage area comprising:

(a) reading said target data on said tape using said read head;

(b) writing target data position information to said storage area; and (c) transferring said data position information from a reserve storage area to said centralized storage area;

following said step of updating said centralized storage area, transferring said data position information from said centralized storage area to said reserve storage area, said updateable centralized storage area including no data position information prior to a first transporting of said logical data past said read head; and storing said data position information in said centralized storage area following said first transporting of logical data.

5. A data position information storage and utilization device comprising:

a length of tape for storing partitioned logical data so the partitioned logical data is adapted to be distributed across the length of the tape;

an updateable centralized storage area for receiving and storing data position information relating to said logical data;

a search algorithm for locating target data that is part of said logical data;

a read head for reading said data from said tape, said information being adapted to be stored in said storage area following transporting of said logical data past said read head;

a first store algorithm for controlling the reading of target data from said tape and the storing of said target data position information in said storage area; and a second store algorithm for controlling the reading of non-target data from said tape and the storing of non-target data position information in said storage area.

6. A device as claimed in claim 5, wherein said updateable centralized storage area is configurable to store data position information relating to substantially all of said logical data.

7. A device as claimed in claim 5 wherein said updateable centralized storage area is configurable to store data position information relating to selected data groups, said data groups being adapted to be distributed across said length of tape.

8. A device as claimed in claim 5, further comprising a tape drive, wherein said updateable centralized storage area, said read head, said search algorithm and said first and said second store algorithms are located in said tape drive.

* * * * *